United States Patent [19]
Dorris

[11] Patent Number: 6,116,834
[45] Date of Patent: *Sep. 12, 2000

[54] DRYWALL SCREW

[76] Inventor: Kenneth L. Dorris, 1696 Clara Ave., Fortuna, Calif. 95540

[*] Notice: This patent is subject to a terminal disclaimer.

[21] Appl. No.: 09/262,913

[22] Filed: Mar. 5, 1999

Related U.S. Application Data

[63] Continuation-in-part of application No. 09/076,913, May 13, 1998, Pat. No. 5,890,860.

[51] Int. Cl.$^7$ .................................................. F16B 23/00
[52] U.S. Cl. ............................ 411/404; 411/403; 411/399
[58] Field of Search .................................... 411/395, 399, 411/402–410

[56] References Cited

U.S. PATENT DOCUMENTS

| | | |
|---|---|---|
| 135,388 | 1/1873 | Tucker . |
| 350,231 | 10/1886 | Brown . |
| 366,158 | 7/1887 | Dow . |
| 2,058,197 | 10/1936 | West . |
| 2,165,425 | 7/1939 | Tomalis . |
| 3,177,755 | 4/1965 | Kahn . |
| 4,228,723 | 10/1980 | Cunningham . |
| 4,355,552 | 10/1982 | Gutshall . |
| 5,199,839 | 4/1993 | DeHaitre . |
| 5,203,657 | 4/1993 | Nagoshi et al. . |
| 5,205,694 | 4/1993 | Nagoshi et al. . |
| 5,249,882 | 10/1993 | Nagoshi et al. . |
| 5,302,068 | 4/1994 | Janusz et al. . |
| 5,425,407 | 6/1995 | Archuleta et al. . |
| 5,641,258 | 6/1997 | Sala . |

FOREIGN PATENT DOCUMENTS 501548  3/1939  United Kingdom ................... 411/403

*Primary Examiner*—Flemming Saether
*Attorney, Agent, or Firm*—Nixon & Vanderhye

[57] ABSTRACT

The drywall screw includes an elongated shaft about an axis, a screw head at one end and threads about the shaft. The screw head has a recess having upper and lower portions. The upper portion is comprised of an upwardly flared thin-walled section having convex and concave interior and exterior surfaces, respectively. The lower portion includes a Phillips head slot for receiving a Phillips head driver. The recess in the head of the drywall screw and the outwardly flared head enables the screw to be driven into the drywall without tearing or loosening the paper overlying the drywall, while simultaneously providing a sufficient recess for receiving the drywall mud finishing compound. In a further form of drywall screw, the upper portion of the screw head is formed by a thin-walled portion defining a conical surface of revolution about the axis of the screw.

17 Claims, 3 Drawing Sheets

DRYWALL SCREW

RELATED APPLICATIONS

This application is a continuation-in-part of application Ser. No. 09/076,913, filed May 13, 1998 now U.S. Pat. No. 5,890,860.

TECHNICAL FIELD

The present invention relates to a screw construction, particularly for use in securing drywall (sheetrock) to supports such as metal or wooden studs and particularly relates to a drywall screw which precludes or inhibits tearing or breaking of the paper surface of the drywall while providing a substantially large area within the screw head for fill.

BACKGROUND

Drywall (sheetrock) is a gypsum composition in board form covered by paper on both sides typically fastened to supports such as wooden or metal studs by nails or screws with adhesive being sometimes used as an adjunct to the nails or screws. It will be appreciated that broken or torn paper around the head of any drywall fastener such as a nail or a screw is a principal concern when installing drywall. When the paper on the face side of the drywall, i.e., the side on which the fasteners are being driven into the drywall and into the supports, becomes loose, torn or broken about the fastener, the result is a "popper." Too many poppers on a given piece of drywall means that the drywall is not properly or safely attached to the supports, and could result in separation of the drywall from the support. Drywall, as is well known, is quite heavy, e.g., a 4'×12' length and 5" thick weighs over 100 pounds and its unanticipated separation from wall or ceiling supports could cause serious injury. Poppers also provide an unappealing appearance and are difficult to repair in a manner providing the same structural support to the drywall as intended when originally installed.

Present-day drywallers typically use nails or screws to fasten the wallboard to the underlying supports. Typically, the head of a drywall nail is concave and a sheetrock hammer face is convex. The hammer face is convex so that the paper around the head of the nail when driven home won't be broken by the hammer. Also, the convex hammer face creates the depth and expanse of a dimple in the drywall for receiving the appropriate fill. When the nail is properly driven through the drywall and into a stud, the convex face of the hammer flattens the concave nail head which catches the paper, securing it inside the dimple created by the hammer, thus preventing a popper. When properly performed, the next step is to fill the dimple with the drywall mud compound covering the nail, i.e., "spotting the fasteners," until the compound in the dimple lies flush with the surface of the drywall. It will be appreciated that the head of the drywall nail resides at the bottom of the dimple and its role is to hold the stretched surface paper of the drywall tightly to the smashed gypsum under the paper of the dimple, securing the paper to the drywall and the drywall to the support. However, even experienced drywallers will sometimes cause the paper about the nail head to be torn or broken.

Multi-purpose screws are also used to secure drywall to supports. Typically, such multi-purpose screw comprises a flat head. The screw must be recessed beneath the surface of the paper on the drywall. While the paper can and does stretch as the screw head is passing into the drywall, the paper about the screw head is oftentimes broken or torn when recessing the screw head beneath the surface of the drywall paper. Insufficient recessing of the flat head of the drywall screw relative to the paper surface leaves an insufficient dimple or recess for receiving the drywall mud compound, resulting in the inability of the mud compound to be retained in the dimple or recess and, at the same time, without having the face of the screw visible through the thin coats of compound. Driving the screw too deep into the gypsum will result, of course, in torn or loose paper and a popper. Electrically powered screw guns are often used to drive the drywall screws through the drywall and into the support. However, these can and often do drive the screw too far, creating a small hole in the paper which results in the "popper." Basically, with both the nail and screw-type fasteners for securing drywall, if the paper is broken, the installation of the drywall has not been properly achieved and, over time, problems associated with those flaws will become apparent.

DISCLOSURE OF THE INVENTION

According to a preferred embodiment of the present invention, there is provided a drywall screw which, by a specific construction of the screw, prevents or inhibits the formation of "poppers," while at the same time provides a sufficient recess or dimple to retain the drywall mud compound in the recess flush with the surface of the paper. To accomplish this, the drywall screw of the present invention is comprised of a screw body having an elongated shaft, threads about the shaft and a head at one end of the screw specifically designed to enable the screw head to be recessed without breaking the face paper of the drywall, while at the same time affording a sufficient depth of recess enabling the head of the screw to be covered with the drywall mud compound. More particularly, the head of the drywall screw comprises a thin-walled upper portion having a central recess bounded by a substantially convex surface of the thin-walled upper portion. The outer surface of the screw head comprises a concave surface, the thin wall of the head being of constant thickness throughout the extent of the upper portion. The lower portion of the head comprises a recessed slot, preferably a cruciform slot formation for receiving the head of a driver, for example, a Phillips head driver in the case of the cruciform slot. The present drywall screw construction provides an improved sheetrock screw which does not break the paper, while simultaneously providing a substantially large area in the form of the recess in the top portion of the screw for filling and retaining the drywall mud compound. This large area is formed by the cup of the screw head, very much similar to the manner in which the dimple caused by a hammer driving a nail into sheetrock is sufficiently large to retain the mud compound.

To use the present drywall screw, an electric screw gun can be used with the Phillips head driver on the screw gun engaging in the recessed cruciform slotted arrangement of the lower portion of the head. Note that the convex surface of the screw head surrounding the recess forms a guide for guiding the Phillips head driver into the cruciform slots. The drywall screw is then run into the drywall such that it is recessed slightly below the surface of the drywall without breaking the paper face of the drywall. The slight recessing of the screw head inwardly of the paper surface and the recess provided in the screw head afford ample volume to receive and retain the drywall mud compound in the overall recess formed by the finally seated screw.

In a further preferred embodiment of the present invention, the drywall screw hereof has a head having upper and lower portions, the upper portion of which includes a thin-walled portion defined by a conical surface of revolution about the axis of the screw. As in the prior embodiment, the lower portion of the head has at least one slot for receiving a tool head for driving the screw and preferably a pair of slots for receiving a Phillips-type tool head. The thin-walled portion forming the upper portion of the head has a constant wall thickness between the top of the screw and the base of the upper head portion. The angle of the surface of revolution forming the thin-walled portion is preferably about 40° and preferably lies within a range of 30–50°. As in the prior embodiment, the thin-walled conical section affords a substantially large area in the form of the recess in the top portion of the screw head for filling and retaining the drywall mud compound.

In a preferred embodiment according to the present invention, there is provided a screw for securing drywall to a support, the drywall having an outer paper surface and an interior composition, comprising a screw body having an elongated shaft about an axis, a screw head at one end of the shaft and threads about the shaft, the head including a recess and having upper and lower portions, the upper portion being defined by a wall of the screw head symmetrical about the axis, the lower portion forming at least one slot for receiving a tool head for driving the screw, the slot terminating at an upper end in a base extending in a plane generally normal to the axis and forming a lower end of the upper portion, the wall having a convex arcuate interior surface and an exterior surface, the upper portion of the head having a width greater than a width of the screw threads about the shaft for engaging and overlying the paper surface of the drywall, the wall adjoining the shaft at an axial location along the head corresponding to the axial location of the base, the diameter of the base within the wall corresponding substantially to the diameter of the shaft less twice the thickness of the wall at the juncture of the wall and the shaft.

In a further preferred embodiment according to the present invention, there is provided a screw for securing drywall to a support, the drywall having an outer paper surface and an interior composition, comprising a screw body having an elongated shaft about an axis, a screw head at one end of the shaft and threads about the shaft, the head including a recess and having upper and lower portions, the upper portion including a thin-walled portion of the screw head defined by a conical surface of revolution about the axis, the lower portion forming at least one slot for receiving a tool head for driving the screw, the slot terminating at an upper end in a base extending in a plane normal to the axis and forming a lower end of the upper portion, the thin-walled portion having a conical interior surface portion and a conical exterior surface portion, the upper portion of the head having a width greater than a width of the screw threads about the shaft for engaging and overlying the paper surface of the drywall, the wall adjoining the shaft at an axial location along the head corresponding to the axial location of the base.

Accordingly, it is a primary object of the present invention to provide a novel and improved drywall screw which prevents or inhibits the breaking the paper on the drywall when driven into the drywall and a support and simultaneously affords a sufficient recess for receiving and retaining drywall mud compound.

BEST MODE FOR CARRYING OUT THE INVENTION

Figure 2:
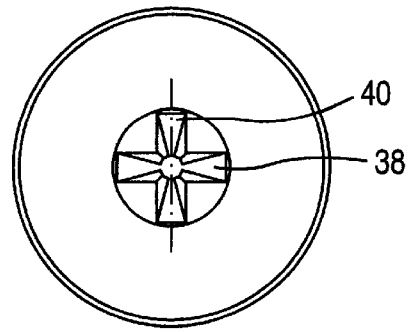
FIG. 2 is a top elevational view thereof.
Figure 1:
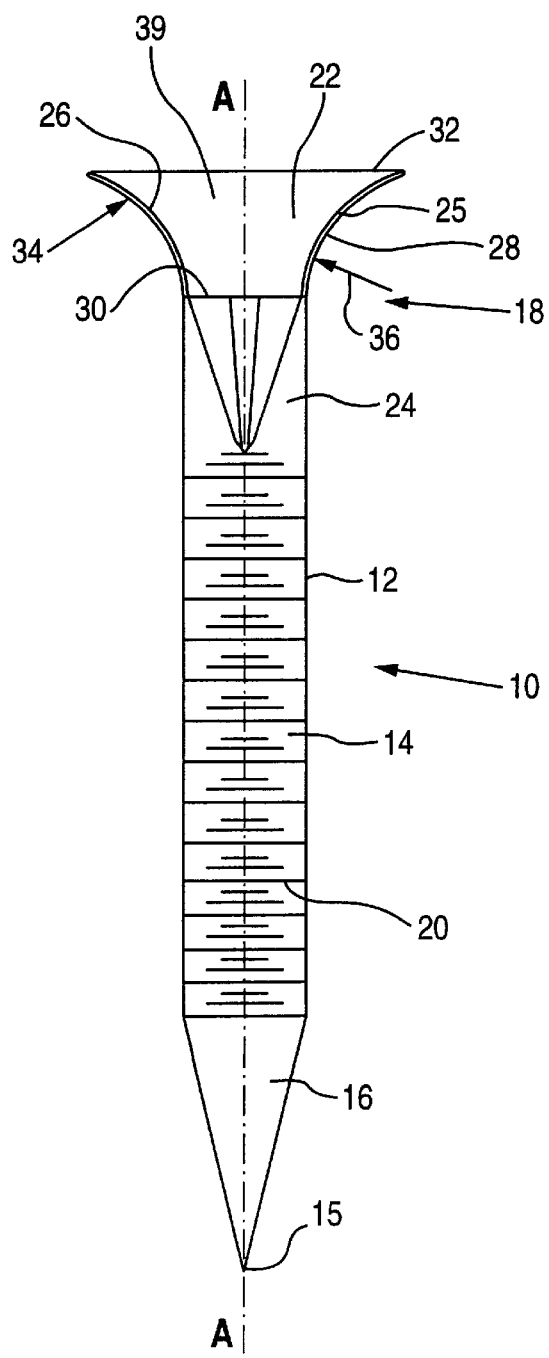
FIG. 1 is a side elevational view of a drywall screw according to the present invention with portions in cross-section.
Figure 3:
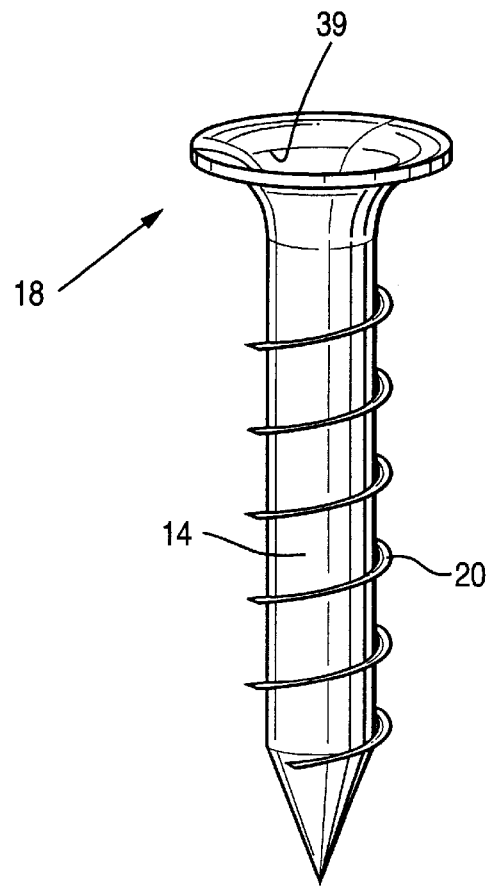
FIG. 3 is a perspective view of the drywall screw.

Referring now to the drawings, particularly to FIG. 1, there is illustrated a drywall screw, generally designated 10, comprised of a screw body 12 having a shaft 14, a conical tip 16 and a head, generally designated 18. As illustrated, the shaft 14 is generally cylindrical about an axis A—A passing through the point 15 of the conically tapered end 16 and centrally through the head 18. Screw threads 20 are applied about the shaft 14 as best illustrated in FIG. 3. Threads 20 are preferably American Standard fine threads for use with metal framing. It will be appreciated that the drywall screw with the threads 20 may also be used with equal efficiency in wood framing.

Referring back to FIG. 1, the screw head 18 includes an upper portion 22 and a lower portion 24. The upper portion 22 comprises a thin-walled portion 25 having an interior convex surface 26 and an exterior concave surface 28. The wall 25 flares outwardly and upwardly from a base 30 generally cylindrical with the shaft 20 to an upper edge 32 which lies in a plane extending generally normal to the axis A—A. The thin-walled portion 25 curves continuously inwardly toward the long axis of the screw and along different radii forming a convex surface of revolution about the screw axis. The radius 34 along an upper section of the thin-walled member 25 is larger than the radius 36 of the wall portion 25 forming the lower section of the upper portion 22. Thus, the thin-walled portion 25 curves outwardly rapidly, with the curve becoming more shallow toward the upper end of the screw head 18.

The lower portion 24 of the screw head 18 forms part of the shaft 14 of the screw. The lower portion includes at least one slot 38 opening into the recess 39 formed by the upper thin-walled portion 25. Preferably, however, the slot 38 is joined with a second slot 40 forming a cruciform slot for receiving a Phillips head drive member. The upper face of the lower portion 24 constitutes the base 30 and lies in a plane normal to the axis A—A at the juncture of the upper and lower portions 22 and 24, respectively.

In a preferred form of the present invention, the thickness of the thin-walled portion 25 is preferably about 0.025 inches, although the thickness could be less, e.g., to about 0.016 inches. The depth of the recess 39 from the upper edge of the thin-walled portion 25 to the base 30 of the lower portion of the screw head 18 is preferably 0.25 inches. The depth of the lower portion 24 is preferably 0.219 inches. Thus, it will be appreciated that the slots 38 and 40 forming the Phillips head drive receptacle are recessed well below the upper edge 32 of the head 18. The overall diameter of the shaft 14 of the screw including the fine threads 20 is about 0.187 inches and the diameter of the shaft is about 0.125 inches without the threads. The diameter of the head is about 0.375 inches whereby the diameter of the end of the screw at the head end thereof is about two times the overall diameter of the shaft. The overall length of the drywall screw varies to accommodate different thicknesses of drywall as well as building codes. Thus, the overall length of the drywall screw hereof from the outside edge of the head 18 to the tip 15 in a preferred form will vary, for example, within a range of 1⅜ inches for ½ inch wallboard, 1⅝ inches for ⅝ inch wallboard to 1⅞ inches long for use with two layers of 1⅝ inch wallboard. The depth of the recess 39 between the upper end of the screw head and the base 30 preferably lies within a range of 0.18 to 0.13 of the length of the screw, particularly for screws within the range of lengths from 1.375 to 1.875 inches. The overall depth of the recess, i.e., the upper and lower portions 22 and 24, respectively, in the preferred embodiment is .47 inches. Hence that depth for screws 1⅜, 1⅝ and 1⅞ inches long is preferably within a range of 0.42 to 0.25 of the length of those screws, respectively. From a review of FIG. 1, it will be appreciated that the diameter of the base 30 within thin-walled portion 25 corresponds substantially to the diameter of the shaft less twice the thickness of the walled portion at the juncture of the walled portion and the shaft.

Figure 4:
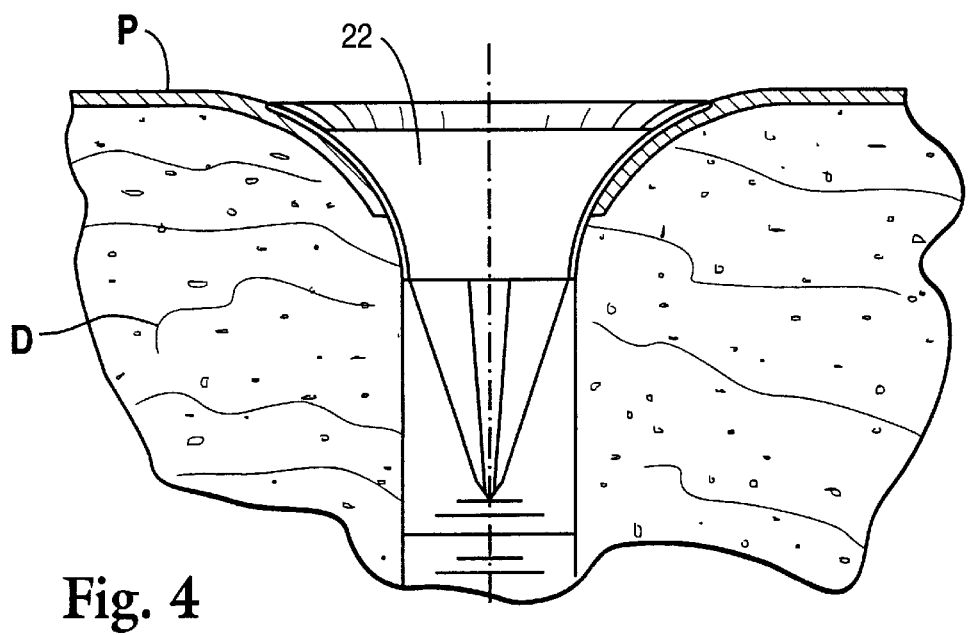
FIG. 4 is an enlarged cross-sectional view of the head of the drywall screw finally seated in the drywall.

To use the drywall screw hereof, a driver, preferably with a Phillips head, is inserted into the recess 39 of the screw head 18. It will be appreciated that the convex wall surface of the upper thin-walled portion of the screw head guides the screw head driver into the slotted arrangement in the lower portion of the screw head. This facilitates coupling the driver to the screw. Upon screwing the screw through the drywall into the underlying support, i.e., a wood or metal stud, the screw head may be recessed slightly below the surface of the drywall D, as illustrated in FIG. 4, without breaking the paper P on the face of the wallboard. Once the driver is removed, it will be appreciated that the cupped head 18 of the fastener, along with the dimpled surface D.S. of the drywall D serves as the recess into which the mud compound is received for finishing the drywall. A particular advantage of the foregoing-described screw construction is that when the drywall spotter is run over the screw head, the mud compound fills the recess in the screw head and the volume above the screw head within the slight recess formed by the screw in sufficient volume to prevent the mud compound from falling back out of the recess. The usual finishing operations are then applied to the drywall and mud compound.

Figure 5:
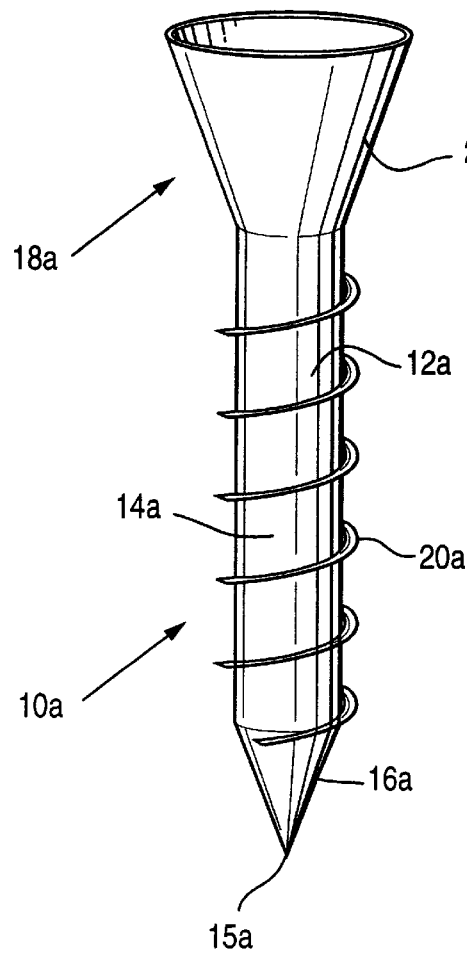
FIG. 5 is a perspective view of a drywall screw according to a second embodiment of the present invention.
Figure 6:
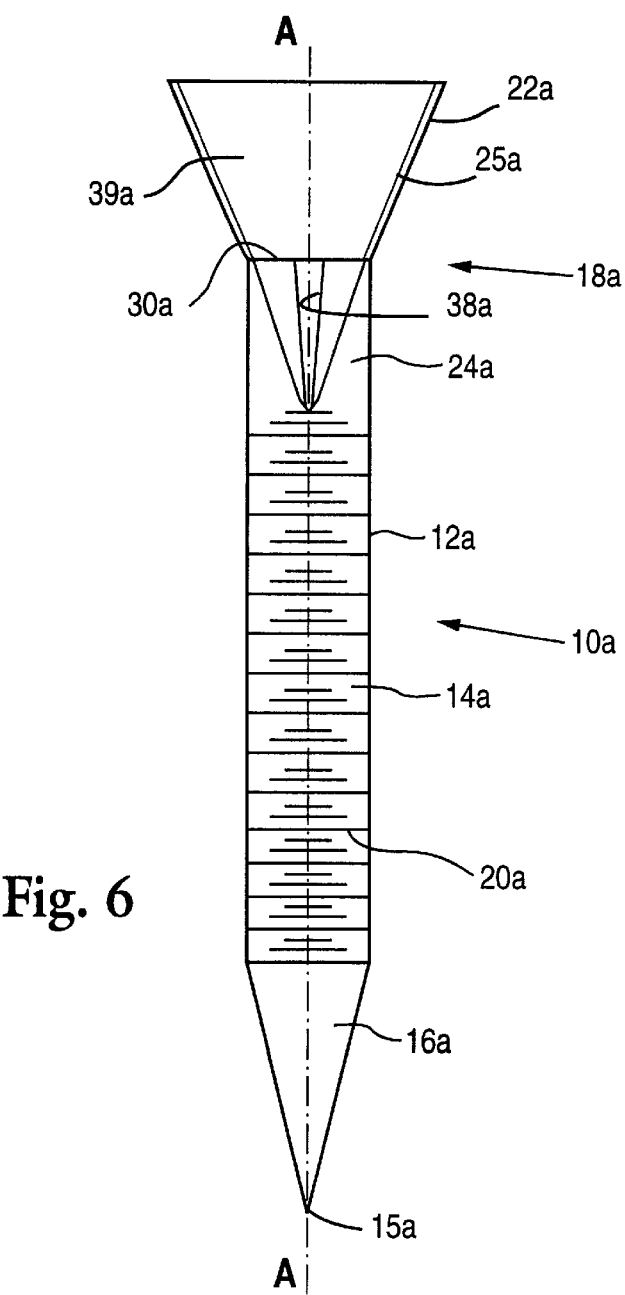
FIG. 6 is a side elevational view of the drywall screw illustrated in FIG. 5, with portions thereof in cross-section.

Referring now to the embodiment of drywall screw illustrated in FIGS. 5 and 6, wherein like reference numerals apply to like parts as in the prior embodiment, followed by the suffix "a," there is illustrated a drywall screw, generally designated 10a, comprised of a screw body 12a having a shaft 14a, a conical tapered end 16a and a head, generally designated 18a. Screw threads 20a are applied about the shaft 14a as illustrated in FIG. 5. Referring to FIG. 6, the screw head 18a includes an upper portion 22a and a lower portion 24a. The upper portion 22a includes a thin-walled conical portion 25a having an axis of revolution coincident with the axis A—A of the screw 10a. That is, the upper portion 22a of the head 18a has conical interior and exterior surfaces formed about the axis A—A. As in the prior embodiment, the lower portion 24a of the screw head 18a includes at least one slot 38a opening into the recess 39a formed by the upper thin-walled conical portion 25a. Preferably, the slot 38a is formed of a cruciform configuration for receiving a Phillips head drive member. The upper face of the lower portion 24a constitutes the base 30a and lies in a plane normal to the axis A—A at the juncture of the upper and lower portions 22a and 24a, respectively. In this form, however, the screw threads 20a not only extend about the shaft 14a but extend upwardly to surround the lower portion of the head 18a.

In a preferred form of this second embodiment of the present invention, the thickness of the thin-walled portion 25a is preferably about 0.031 inches, although it will be appreciated that the thickness can be slightly larger or smaller. The angle between the conical upper portion 22a and the axis A—A is about 40° and may lie within a range of 30–50°. In this form, the axial extent or depth of the cone from the upper margin of the head to the base is approximately ³⁄₁₆-inch. The diameter of the top of the cone of the head is approximately ¹⁰⁄₃₂-inch, while the diameter of the bottom of the cone of the head is ⁵⁄₃₂-inch, i.e., a 2:1 ratio. The depth of the lower portion 24a is similar as in the prior embodiment, i.e., 0.219 inches, thereby locating the Phillips head drive receptacle well below the upper marginal edge of the conical thin-walled portion 25a. As in the prior embodiment, the overall length of the drywall screw hereof from the outside edge of the head to the tip 15a of the conical end 16a varies similarly as in the prior embodiment depending upon the thickness of the wallboard with which the drywall screw is to be used. Also as in the prior embodiment, the diameter of the base 30a within the thin-walled portion 25a corresponds substantially to the diameter of the shaft 14a less twice the thickness of the thin-walled portion 25a at the juncture of the thin-walled portion 25a and the shaft 14a.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A screw for securing drywall to a support, the drywall having an outer paper surface and an interior composition, comprising:

a screw body having an elongated shaft about an axis, a screw head at one end of the shaft and threads about said shaft;

said head including a recess and having upper and lower portions, said upper portion being defined by a wall of said screw head symmetrical about said axis, said lower portion forming at least one slot for receiving a tool head for driving the screw;

said slot terminating at an upper end in a base extending in a plane generally normal to the axis and forming a lower end of said upper portion;

said wall having a convex arcuate interior surface and an exterior surface;

the upper portion of said head having a width greater than a width of the screw threads about the shaft for engaging and overlying the paper surface of the drywall;

said wall adjoining said shaft at an axial location along the head corresponding to the axial location of the base, the diameter of the base within said wall corresponding substantially to the diameter of the shaft less twice the thickness of said wall at the juncture of said wall and said shaft.

2. A screw according to claim 1 wherein the wall has a concave exterior surface, an axial extent and has a constant thickness throughout said axial extent between said convex interior and concave exterior surfaces thereof.

3. A screw according to claim 2 wherein the wall is a thin wall having a thickness of about 0.025 inches.

4. A screw according to claim 2 wherein said wall has different radii at spaced locations therealong with a first radius axially closer to the upper end of the screw and a second radius less than said first radius lying axially between said first radius and said shaft.

5. A screw according to claim 1 wherein said lower portion includes a generally cruciform slotted arrangement for receiving a Phillips-type head of a driver.

6. A screw according to claim 1 wherein, said wall has an axial extent and a constant thickness throughout its axial extent between said interior and exterior surfaces thereof, the wall having different radii at spaced locations therealong with a first radius axially closer to the upper end of the screw and a second radius less than said first radius lying axially between said first radius and said shaft.

7. A screw according to claim 6 wherein said lower portion includes a generally cruciform slotted arrangement for receiving a Phillips-type head of a driver.

8. A screw according to claim 7 wherein the wall is a thin wall having a thickness of about 0.025 inches.

9. A screw according to claim 1 wherein the axial distance between the upper end of the screw head and the base is greater than or equal to 0.18 of the length of the screw.

10. A screw according to claim 9 wherein the screw has a length between 1.35 and 2.0 inches.

11. A screw according to claim 1 wherein the axial distance between the upper end of the screw head and the base of the upper portion is about 0.25 inches.

12. A screw according to claim 1 wherein the diameter of the end of said screw at the upper end thereof about twice the diameter of the shaft.

13. A screw for securing drywall to a support, the drywall having an outer paper surface and an interior composition, comprising:

a screw body having an elongated shaft about an axis, a screw head at one end of the shaft and threads about said shaft;

said head including a recess and having upper and lower portions, said upper portion including a thin-walled portion of said screw head defined by a conical surface of revolution about said axis, said lower portion forming at least one slot for receiving a tool head for driving the screw;

said slot terminating at an upper end in a base extending in a plane normal to the axis and forming a lower end of said upper portion;

said thin-walled portion having a conical interior surface portion and a conical exterior surface portion;

the upper portion of said head having a width greater than a width of the screw threads about the shaft for engaging and overlying the paper surface of the drywall;

said thin-walled portion adjoining said lower portion at an axial location along the head corresponding to the axial location of the base.

14. A screw according to claim 13 wherein said lower portion includes a generally cruciform slotted arrangement for receiving a Phillips-type head of a driver.

15. A screw according to claim 13 wherein said thin-walled portion has an axial extent and a constant thickness through its axial extent between said interior and exterior surface portions thereof.

16. A screw according to claim 15 wherein said lower portion includes a generally cruciform slotted arrangement for receiving a Phillips-type head of a driver.

17. A screw according to claim 13 wherein the depth of said recess to said base is at least 0.13 of the overall length of the screw.

* * * * *